United States Patent Office 2,929,763
Patented Mar. 22, 1960

2,929,763

INCREASING ANABOLIC ACTIVITY WITH 1-DEHYDRO-17α-METHYL-TESTOSTERONE

Albert Wettstein and Ernst Vischer, Basel, and Charles Meystre, Arlesheim, Switzerland, assignors to Ciba Pharmaceutical Products, Inc., Summit, N.J.

No Drawing. Application June 4, 1958
Serial No. 739,687

Claims priority, application Switzerland February 7, 1955

5 Claims. (Cl. 167—65)

The present invention relates to a series of new 1-dehydro compounds of the steroid series (and processes for their preparation), which can be used as medicaments or as intermediate products for the manufacture thereof.

This is a continuation in part of copending application Serial No. 563,437 filed on February 6, 1956, by Albert Wettstein et al., which describes a process for the microbiological introduction of double bonds in the 1,2 or 4,5 position of a steroid nucleus by the aerobic action of enzymes of fungi of the species Didymella lycopersici, Calonectria decora, Alternaria passiflorae, Ophiobolus heterostrophus or Ophiobolus miyabeanus.

By the introduction of the 1:2-double bond and/or 4:5-double bond valuable medicaments of the steriod series, especially of the pregnane series, are obtained, which are distinguished on comparison with therapeutically active compounds which are saturated in 1,2-position, by an enhanced activity. Thus the 1-dehydro compounds of cortisone, hydrocortisone and 9α-fluorohydrocortisone show a stronger glycogenic action than the corresponding compounds without the double bond in 1,2-position.

The products of the invention include 1-dehydro-18-oxygenated pregnane compounds such as $\Delta^{1,4}$-3:18:20-trioxo-11β:21-dihydroxy-pregnadiene (1 - dehydro-aldosterone), $\Delta^{1,4}$-3:11:18:20-tetraoxo - 21 - hydroxy-pregnadiene, $\Delta^{1,4}$-3:20-dioxo-11β:18:21-trihydroxy-pregnadiene, $\Delta^{1,4}$-3:18:20-troxo - 11β:17α:21-trihydroxy-pregnadiene, $\Delta^{1,4}$-3:11:18:20 - tetraoxo-17α:21-dihydroxy-pregnadiene, $\Delta^{1,4}$-3:20 - dioxo - 11β:17α:18:21-tetrahydroxy-pregnadiene, $\Delta^{1,4}$-3:20-dioxo-18:21-dihydroxy-pregnadiene, $\Delta^{1,4}$-3:18:20-trioxo-21-hydroxy pregnadiene, $\Delta^{1,4}$-3:20-dioxo-17α:18:21 - trihydroxy-pregnadiene, $\Delta^{1,4}$-3:18:20-trioxo-17α:21-dihydroxy-pregnadiene and 1-dehydro-testosterone derivatives such as 1-dehydro-17α-methyl-testosterone and 1-dehydro-17α-ethinyl-testosterone, and functional drivatives, such as esters, ethers, halogen derivatives, for example 9α-halogen, especially the fluorine or chlorine compounds. In the esters and enol esters the acid residues are derived from any organic or inorganic acids, such as aliphatic, alicyclic, araliphatic, aromatic or heterocyclic carboxylic, thione carboxylic, thiol carboxylic or sulfonic acids, preferably from formic acid, acetic acid, chloracetic acids, trifluoracetic acid, propionic acid, butyric acids, valeric acids, diethylacetic acid, trimethylacetic acid, tertiary butyl acetic acid, caproic acids, oenanthic acids, caprylic acids, palmitic acids crotonic acid, undecanic acid, undecylenic acid, oxalic acid, succinic acid, pimelic acid, maleic acid, lactic acid, carbamic acids, alkoxy-carboxylic acids, β-cyclopentyl-propionic acid, hexahydrobenzoic acid, benzoic acid, phenylacetic acid, cyclohexylacetic acid, phenylpropionic acids, trimethylgallic acid, phthalic acid, furane-2-carboxylic acid, isonicotinic acid, methane sulfonic acid, toluene sulfonic acid, sulfuric acids, hydrohalic acids or phosphoric acids. If the products of the process do not have the configuration and do not contain the substituents of therapeutically useful steroids, they can serve as intermediate products for the manufacture of such compounds, for example the above specified compounds.

The new compounds may be prepared by aerobically incubating the corresponding steroids saturated in either one or both of the 1,2 and 4,5 positions with enzymes derived from fungi of the species Didymella lycopersici, Calonectria decora, Alternaria passiflorae, Ophiobolus heterostrophus or Ophiobolus miyabeanus.

For the culture of these fungi, various media containing the desired nutrients may be employed. Preferred media are those containing sugar, such as glucose or lactose; peptones; corn steep liquor; soya products and the like. Advantageously, the culture medium may contain small quantities of mineral salts as well as synthetic nutrients.

The operation is conducted under erobic conditions, for example, in a surface culture or preferably, submerged with stirring or shaking accompanied by passage of air through the culture liquid. The specified fungi are distinguished from other micro-organisms, such as bacteria, by abundant growth under relatively simple culture conditions.

According to the present invention the reaction may take place directly in the fungal cultures by addition of the starting material thereto or directly with the enzymes which are elaborated by the fungi. Alternatively, the mycelium may first be separated out and suspended or homogenized in an aqueous vehicle and contact of the starting material effected therewith; if desired, the starting material may be contacted with filtrates of the fungus mycelium or with aqueous extracts thereof.

The isolation of the products of the process can be carried out by known methods. Their separation can take place for example, by extraction of the reaction mixture with an organic solvent, for example methylene chloride or ethyl acetate. For the further purification of the resulting extract there can suitably be applied, especially chromatography, for example on alumina or silica gel, or distribution methods, for example the counter-current process, or separation by means of Girard reagents such as trimethyl ammonium or pyridinium acetic acid hydrazide. Subsequent to or instead of purification as above, recrystallization from organic or aqueous organic solvents may be preferably employed.

The reaction products obtainable according to the process of the invention can be converted in the customary manner into their functional derivatives, such as oxygen, sulfur or nitrogen derivatives, for example esters, ethers, enol esters, enol ethers, ketals, thioethers and thioketals, also hydrazones, oximes and enamines. In these compounds the hydroxyl and/or oxo groups can be completely or partially functionally converted.

If desired, in resulting compounds functionally converted hydroxyl or oxo groups can be converted into free groups. In a similar manner in polysubstituted derivatives the functionally converted groups can also be partially liberated. This takes place, for example, by chemical or enzymatic hydrolysis, especially with the use of acid or basic agents, by re-esterification or re-acetalization. From derivatives obtained in this manner or also directly and which are only partially converted, for example esterified or etherified, by subsequent functional conversion, for example esterification or etherification, polysubstituted derivatives, especially mixed esters or mixed ethers or ester-ethers, can be produced.

The new compounds can be used as medicaments in the form of pharmaceutical preparations, which contain the new compounds in admixture with a pharmaceutical organic or inorganic solid or liquid carrier suitable for enteral, parenteral or topical administration. For making up the preparations there can be employed substances which do not react with the new compounds, such as water, gelatine, lactose, starches, magnesium stearate, talc, vegetable oils, benzyl alcohols, gums, polyalkylene glycols, petroleum jelly, cholesterol or any other known carrier for medicaments. The pharmaceutical preparations may be, for example, in the form of tablets, dragees, salves, creams, or in liquid form as solutions or emulsions. If desired, they may contain auxiliary substances, such as preserving agents, stabilizing agents, wetting or emulsifying agents, salts for varying the osmotic pressure or buffers. They may also contain, in combination, other therapeutically useful substances. The new compositions contain preferably from 0.001% to 50% of the new active compounds or from 0.05 mg. to about 300 mg. per dosage unit. The actual dose administered in therapy depends largely on the condition of the individual patient and the desires of the practicing physician.

The following examples illustrate but are in no way intended to limit the invention:

EXAMPLE 1

In an Erlenmeyer flask of 500 cc. capacity 150 cc. of 70% beerwort are sterilized and inoculated with *Calonectria decora*. The whole is shaken for 2 days at 27° C. and there is added under sterile conditions to the now well developed culture a solution of 30 mg. of aldosterone in 1.5 cc. of acetone. Shaking is then continued at 27° C. and after 38 hours the mycelium is filtered off. The culture filtrate is exhaustively extracted with ethyl acetate and the extracts washed with water, dried and evaporated. The residue is chromatographed, as described in Example 1, on 1 gram of silica gel and the individual fractions (20 cc. in each case) are examined by paper chromatography. In the fractions eluted with chloroform-acetone (1:1) mixtures there is a substance which is somewhat more polar than aldosterone and reduces alkaline silver diammine solution. It is crystallized from acetone-ether mixtures and constitutes 1-dehydro-aldosterone. In the ultraviolet spectrum it exhibits strong absorption at 244 m$\mu$.

EXAMPLE 2

2 grams of sodium nitrate, 1 gram of primary potassium ortho-phosphate, 0.5 gram of magnesium sulfate heptahydrate, 0.5 gram of potassium chloride, 50 grams of glucose and 1 gram of Difco yeast extract are dissolved in 1 liter of tap water, brought to pH 5 by addition of a sodium hydroxide solution and sterilized. The resulting nutrient solution is inoculated with 50 cc. of a four-day-old shaking culture of *Didymella lycopersici* and shaken for 48 hours at 27° C., whereby the culture becomes well developed. To four liters of a culture so prepared there is added under sterile conditions a solution of 1 gram of 17$\alpha$-ethinyl-testosterone in 25 cc. of acetone. Shaking is carried out for 8 days at 27° C., the mycelium then filtered off with suction, washed with water and ethyl acetate and the combined filtrates extracted with ethyl acetate. Paper-chromatographic examination of the extraction residue shows that it consists practically exclusively of 1-dehydro-17$\alpha$-ethinyl-testosterone. By crystallization from a mixture of acetone and ether the pure substance is obtained. M.P. 228–233° C., $[\alpha]_D = -17°$ (chloroform).

EXAMPLE 3

2 grams of sodium nitrate, 1 gram of primary potassium ortho-phosphate, 0.5 gram of magnesium sulfate heptahydrate, 0.5 gram of potassium chloride, 50 grams of glucose and 1 gram of Difco yeast extract are dissolved in 1 liter of tap water, brought to pH5 by addition of a sodium hydroxide solution and sterilized. The resulting nutrient solution is inoculated with 50 cc. of a four-day-old shaking culture of *Didymella lycopersici* and shaken for 48 hours at 27° C., whereby the culture becomes well developed. To 2 liters of a culture so prepared there is added under sterile conditions a solution of 500 mg. of 17$\alpha$-methyl-testosterone in 15 cc. of acetone. Shaking is carried out for three days at 27° C., the mycelium then filtered off with suction, washed with water and ethyl acetate and the combined filtrates extracted with ethyl acetate. The extraction residue obtained after evaporation of the solvent is dissolved in a little acetone. On addition of ether, the 1-dehydro-17$\alpha$-methyl-testosterone is obtained in compact crystals. M.P. 163–164° C., $[\alpha]_D = \pm 0°$ (chloroform). U.V. absorption spectrum $\lambda_{max}$. 245 m$\mu$ ($\epsilon$=15,600).

1-dehydro-17$\alpha$-methyl-testosterone is a potent anabolic agent without sex-specific androgenic action. It is known that androgenic hormones have an anabolic action and are therefore used clinically in cases where increased protein synthesis is required. However, the sex-specific action of such hormones may have undesirable effects. 1-dehydro-17$\alpha$-methyl-testosterone represents a genuine advance in that it has an anabolic action with virtually no sex-specific properties and can be very advantageously used in place of the androgenic hormones, for this reason.

When tested in castrated male rats it increased the gain in body-weight and show myotropic effects (increase in the weight of M. elevator ani) similar to those of the male sex hormones proper. The relationship of anabolic to androgenic activity is illustrated by the comparison with 17$\alpha$-methyltestosterone: this compound has per unit of anabolic action from 3 to 4 times the androgenic action of the new 1-dehydro-17$\alpha$-methyl-testosterone.

The anabolic substances known to date possess other hormonal properties in addition to their androgenic effects: it is known, for example, that 19-nor-17$\alpha$-ethyl-testosterone in particular, even when given in small doses, induces the secretory phase in the mucosa of the estrogen-sensitized uterus, e.g. its action is similar to that of progesterone. The daily dose of 19-nor-17$\alpha$-ethyl-testosterone required to elicit this effect is 0.03 mg./kg. subcutaneously or 3 mg./kg. orally. With 1-dehydro-17$\alpha$-methyl-testosterone, even when given in doses up to 300 times higher (10 mg./kg. subcutaneously or 100 mg./kg orally), it is not possible to produce a progesterone-like effect.

The independence of the anabolic action of 1-dehydro-17$\alpha$-methyl-testosterone from its sex-specific effects can also be demonstrated in human beings: For example, 1-dehydro-17$\alpha$-methyl-testosterone was clinically administered in daily doses of 25 and 100 mg. to patients with cancerous and tuberculous cachexia, anorexia, and osteoporosis, as well as to patients convalescing after serious illness. In response to this treatment, a marked decrease in the excretion of nitrogen was noted within 1–2 days following administration of 20–50 mg. of 1-dehydro-17$\alpha$-methyl-testosterone, but no androgenic effect was observed. The body weight showed an increase, this being due not to water retention but to a genuine increase in substance—a fact which was confirmed by determining the total body fluid in several cases.

These properties render 1-dehydro-17$\alpha$-methyl-testosterone especially valuable for the treatment of all those conditions which require an enhanced formation of proteins and in which the sexual effect is undesirable such as underweight, post-operative and post-infectious conditions anorexia, osteoporosis, and in geriatrics.

EXAMPLE 4

*Pharmaceutical preparation containing 1-dehydro-17$\alpha$-methyl-testosterone in tablet form*

| 1 tablet contains: | Mg. |
|---|---|
| 1-dehydro-17$\alpha$-methyl-testosterone | 50.0 |
| Lactose | 60.0 |
| Colloidal silicic acid with hydrolysed starch | 20.0 |
| Wheat starch | 43.0 |
| Arrowroot | 17.0 |
| Magnesium stearate | 2.0 |
| Talc | 8.0 |
| | 200.0 |

*Preparation.*—The 1-dehydro-17α-methyl-testosterone is ground with lactose to form a homogeneous powder mixture and in a mixing and kneading machine is worked up to a uniformly moistened, slightly plastic mass with the prescribed quantities of colloidal silicic acid with hydrolysed starch, wheat starch and deionised water. This mass is homogenized, dried and granulated in the ordinary way. The dry granulate is compressed with arrowroot (for disintegration), and magnesium stearate and talc as lubricant in the customary manner to form tablets of 200 mg. which contain 50 mg. of active substance.

EXAMPLE 5

*Pharmaceutical preparation containing 1-dehydro-17α-methyl-testosterone in ampoule form*

The composition is:

1-dehydro-17α-methyl-testosterone _____ mg__ 10
Neutral, sterile sesame oil to make up _____ ml__ 1

*Preparation.*—The preparation of the ampoules is carried out in the following manner: add 5 ml. of reagent grade acetone to 100 mg. of 1-dehydro-17α-methyl-testosterone in a 100 ml. flask, mix and evaporate off the acetone, then dissolve the residue in sesame oil, U.S.P., purified by heating to 180° C. for 2 hours and bring up to volume with the oil. Filter through a sterile coarse porosity sintered glass filter. Fill 1 ml. into a 1 ml. ampoule and seal.

EXAMPLE 6

A solution of 50 mg. of 1-dehydro-aldosterone in 1 cc. of pyridine is mixed with 1 cc. of acetic anhydride and kept at room temperature for 24 hours. After pouring into water, the product is extracted with methylene chloride, washed with water, diluted hydrochloric acid, sodium carbonate solution and water, dried over anhydrous sodium sulfate and evaporated to dryness. The residue is crystallized from acetone-ether mixtures and constitutes the 21-acetate of 1-dehydro-aldosterone, F.: 179–182°.

Analogous to the process described above the corresponding 21-esters of 1-dehydro-aldosterone with trimethyl acetic acid, phenyl propionic acid and succinic acid can be prepared.

What is claimed is:

1. A method of effecting increased anabolic activity which comprises administering to a patient requiring enhanced formation of protein, a pharmaceutical composition comprising (1) an effective amount of 1-dehydro-17α-methyl-testosterone and (2) a pharmaceutical carrier.

2. A method of effecting increased anabolic activity which comprises administering to a patient requiring enhanced formation of protein, a pharmaceutical composition comprising (1) 1-dehydro-17α-methyl-testosterone in an amount varying from about 0.05 to about 300 mg. and (2) a pharmaceutical carrier.

3. A method of effecting increased anabolic activity which comprises administering to a patient requiring enhanced formation of protein, a pharmaceutical composition comprising (1) 1-dehydro-17α-methyl-testosterone in an amount varying from about 20 to about 50 mg. and (2) a pharmaceutical carrier.

4. A method of effecting increased anabolic activity which comprises administering to a patient requiring enhanced formation of protein, a pharmaceutical composition comprising (1) 1-dehydro-17α-methyl-testosterone in an amount of about 100 mg. and (2) a pharmaceutical carrier.

5. A method of effecting increased anabolic activity which comprises administering to a patient requiring enhanced formation of protein, a pharmaceutical composition comprising (1) 1-dehydro-17α-methyl-testosterone in an amount of about 25 mg. and (2) a pharmaceutical carrier.

References Cited in the file of this patent
UNITED STATES PATENTS

| | | |
|---|---|---|
| 2,783,226 | Gould | Feb. 26, 1957 |
| 2,837,464 | Nobile | June 3, 1958 |